May 12, 1925.
J. M. EADIE ET AL
1,537,339
SHORT TURN TRAILER
Filed Sept. 13, 1923     5 Sheets-Sheet 1
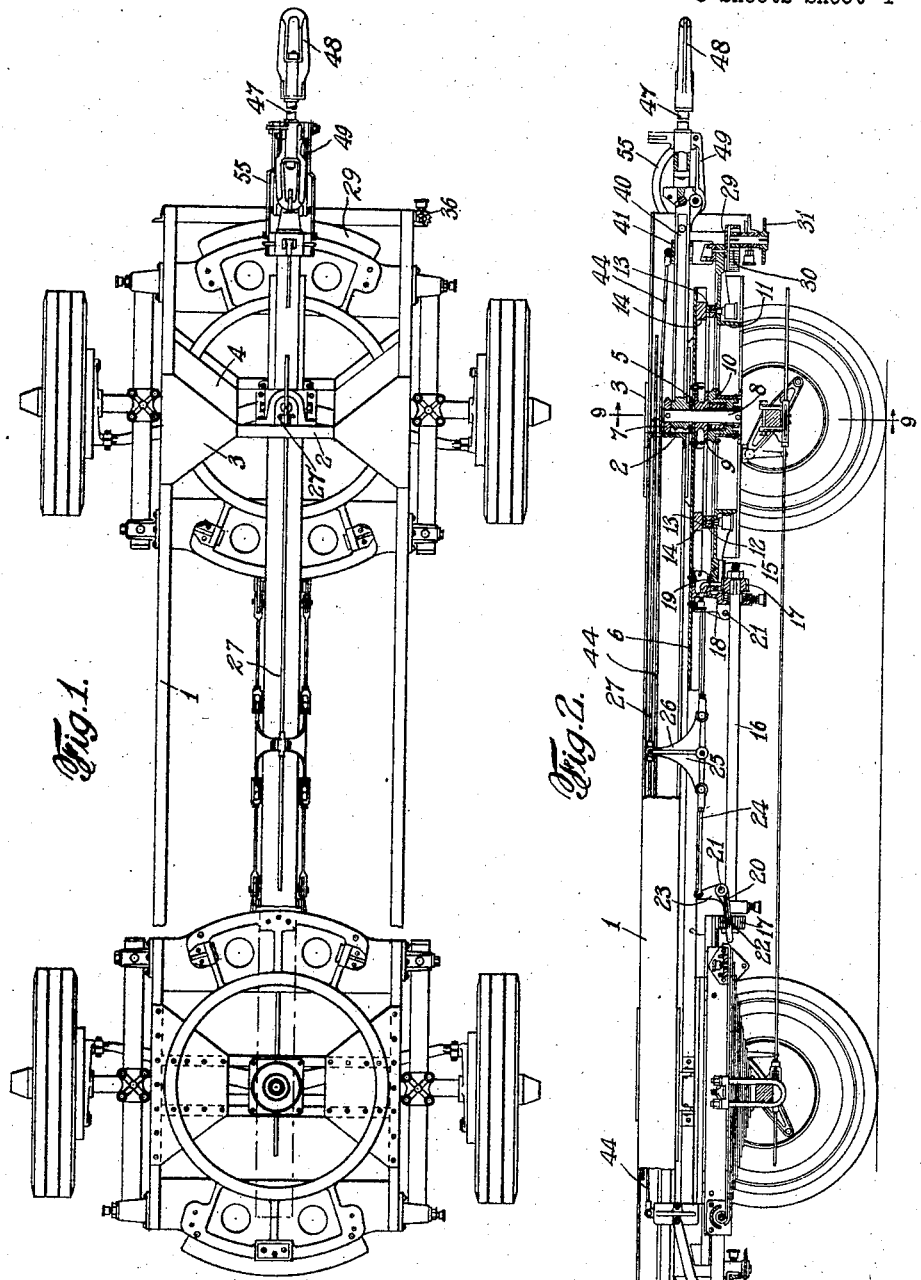
INVENTORS
John M. Eadie and
Oscar P. Liebreich
BY
Richard Eyre
ATTORNEY

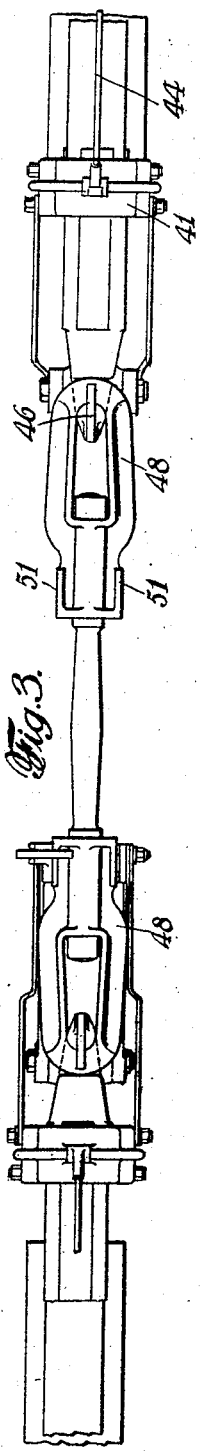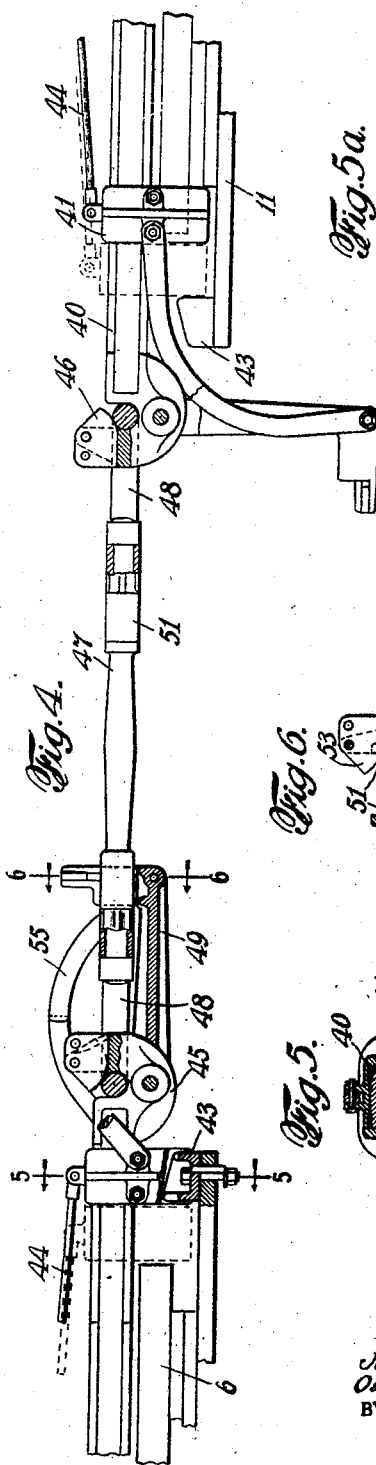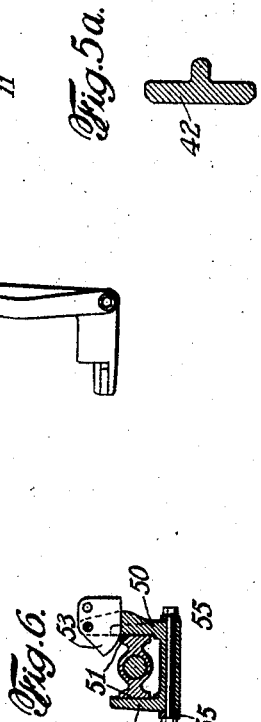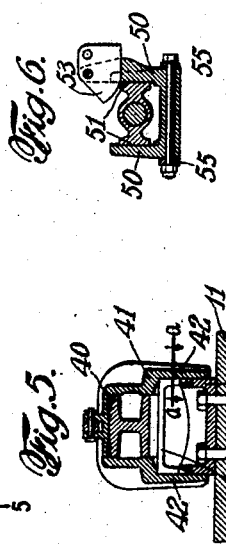

May 12, 1925.
J. M. EADIE ET AL
1,537,339
SHORT TURN TRAILER
Filed Sept. 13, 1923
5 Sheets-Sheet 3
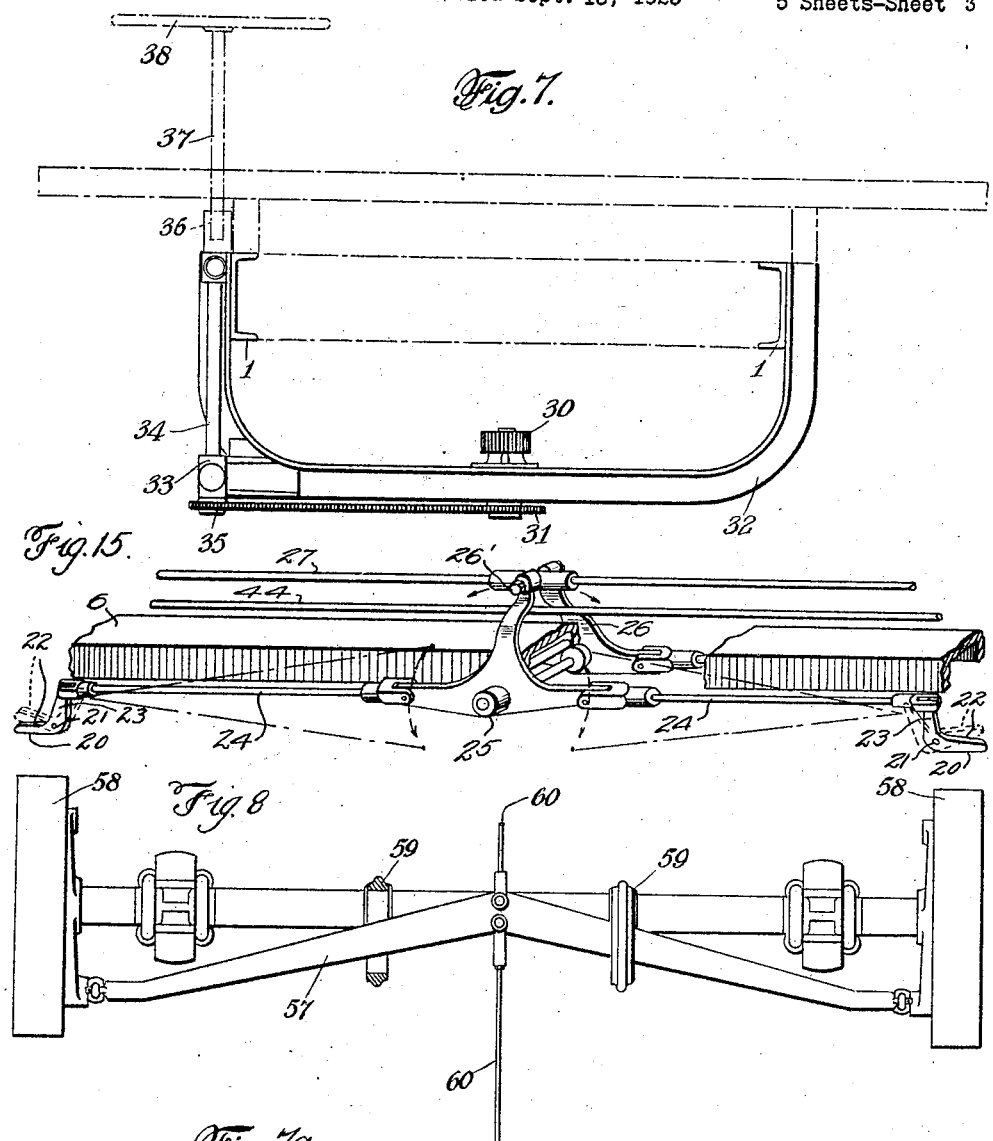
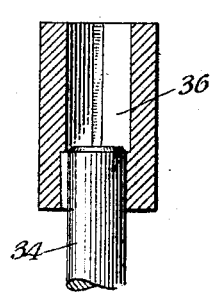
INVENTOR
John M. Eadie and
Oscar P. Liebreich
BY Richard Eyre
ATTORNEY

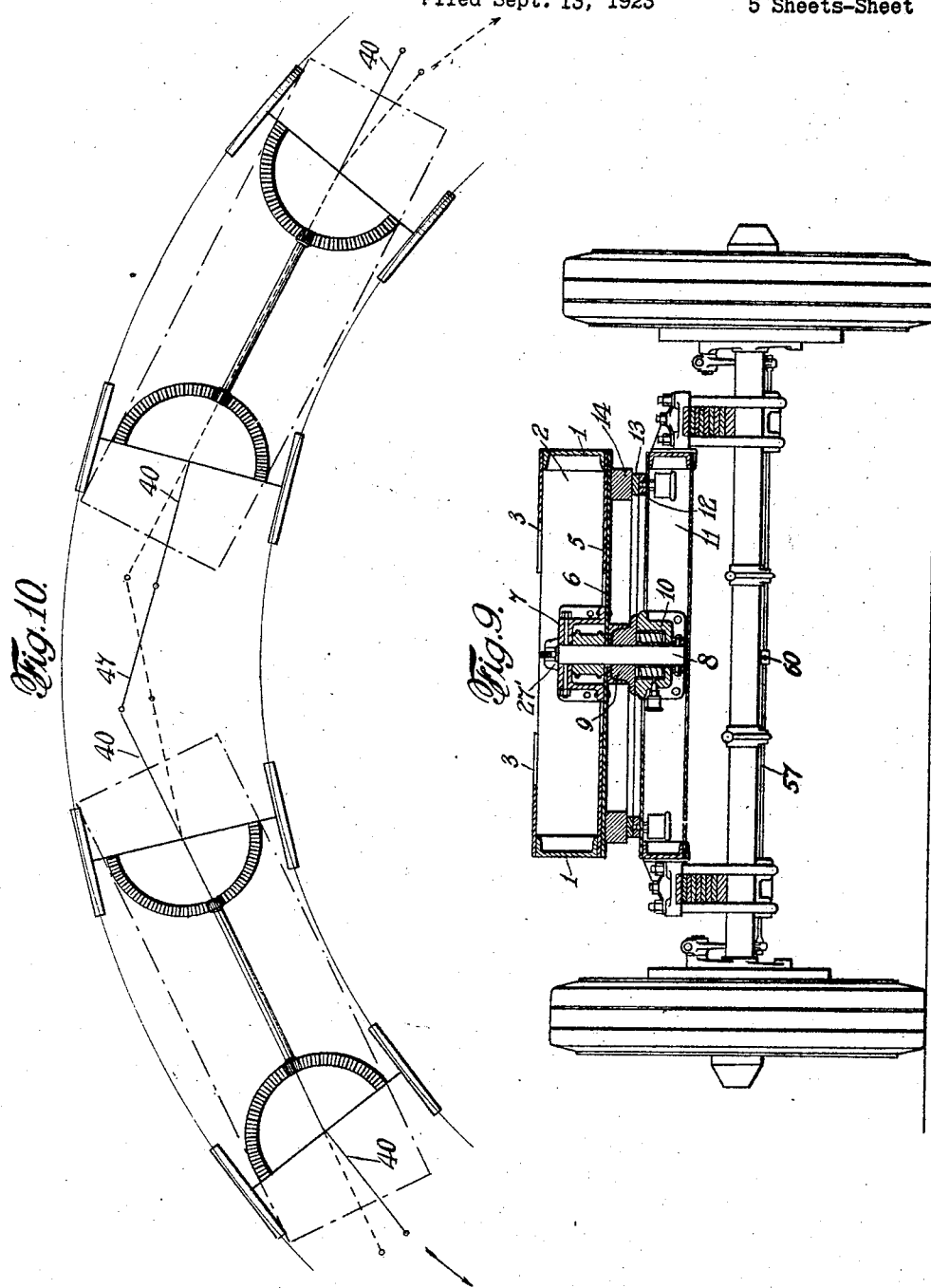

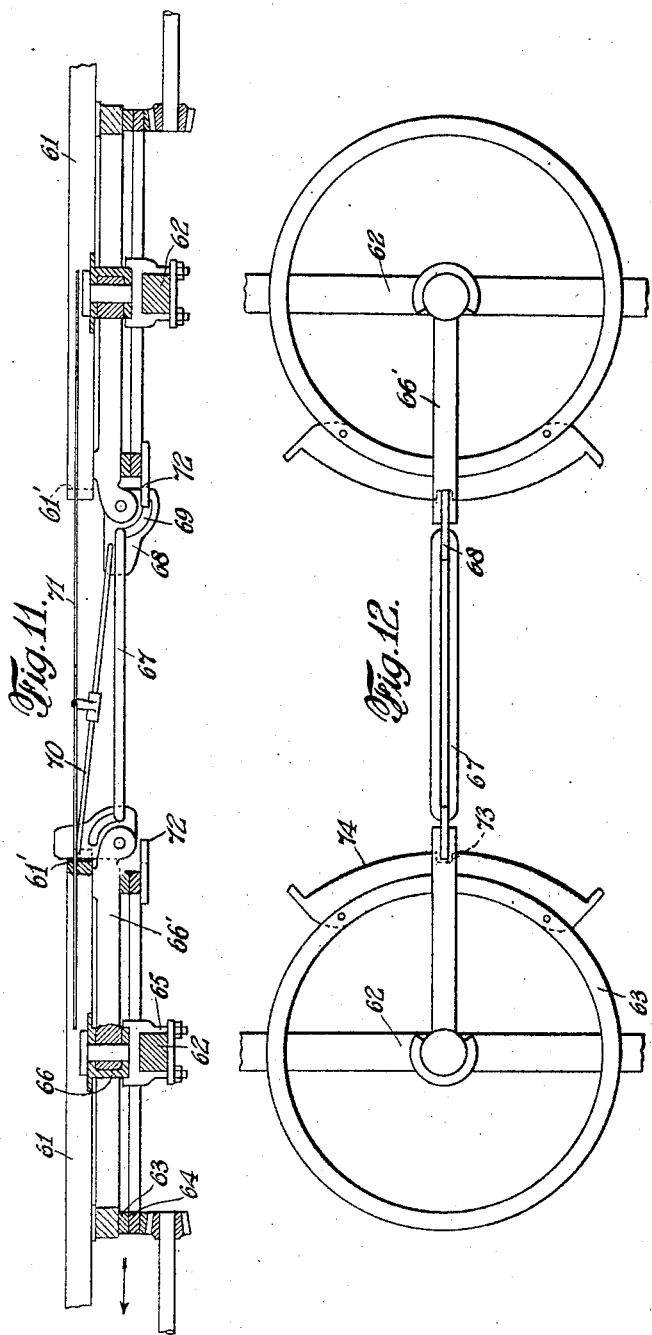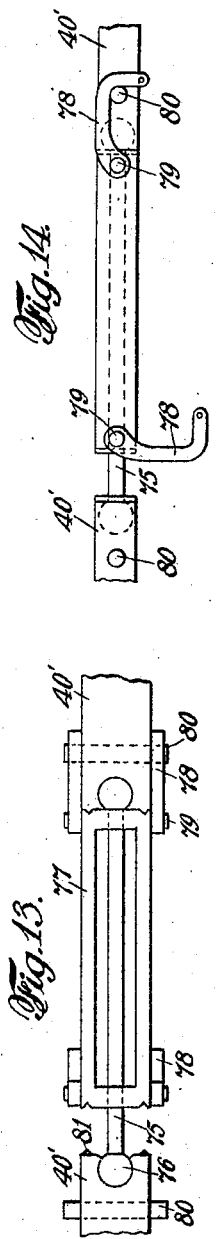

Patented May 12, 1925.

1,537,339

UNITED STATES PATENT OFFICE.

JOHN M. EADIE, OF NEW YORK, AND OSCAR P. LIEBREICH, OF BROOKLYN, NEW YORK; SAID LIEBREICH ASSIGNOR TO SAID EADIE.

SHORT-TURN TRAILER.

Application filed September 13, 1923. Serial No. 662,399.

*To all whom it may concern:*

Be it known that we, JOHN M. EADIE, a citizen of the Dominion of Canada, residing in New York city, whose post-office address is 191 Ninth Avenue, New York city, New York, and OSCAR P. LIEBREICH, a citizen of the United States, residing at and whose post-office address is 21 Linden Street, Brooklyn, New York, have invented new and useful Improvements in Short-Turn Trailers, of which the following is a specification.

This invention relates to road vehicles and particularly to short turn trailers.

The object of the invention, generally, is a novel and improved short turn trailer which is capable of ready connection in train, and having novel and improved draft and coupling connections which insure the tracking thereof with the leading vehicle. More specifically the invention is directed to a readily reversible trailer of this character having novel and improved draft connections at either end which may be manipulated with ease and facility to effect short turn and automatic steering operation for either direction of travel at will.

A further object is the provision of novel and improved coupling devices for connecting short turn trailers in train which contribute to the short turning and tracking functions of the following trailers and which may be connected up and shifted over for reversed direction of travel with ease and dispatch; and a further object is the provision of a system of draft connections and coupling devices, enabling the ready shifting of connections for reversed direction of travel in any position or line up of the train.

A still further object is the provision of control devices at either end of a reversible short turn trailer for simultaneously actuating and shifting the draft connections at either end of the trailer for travel in either direction.

A still further object is the provision of control devices at either end of the trailer for simultaneously effecting the shifting of the coupling devices at either end of the trailer and without the necessity for disconnecting the couplings between adjacent trailers.

A still further object of the invention is the provision of means for simultaneously actuating the control shifting devices for the draft connections and the corresponding control devices for the coupling connections at either end of the trailer.

For a better understanding of the above indicated novel features of the invention, and others which will hereinafter appear, reference may be had to the accompanying drawings forming a part of this application, wherein:

Fig. 1 is a plan view of a trailer chassis showing certain parts broken away.

Fig. 2 is a side view of the chassis with certain parts broken away and illustrated in section.

Fig. 3 is a plan view of the three part draft connection and coupling between two trailers.

Fig. 4 is a part side and sectional view thereof.

Fig. 5 is a section on line 5—5 of Fig. 4.

Fig. 5ª is a section along line *a—a* of Fig. 5.

Fig. 6 is a section on line 6—6 of Fig. 4.

Fig. 7 is an end view of the hand steering control.

Fig. 7ª is a view illustrating the hand steering post connection.

Fig. 8 is a view illustrating the mounting of the brake control beams on the axles.

Fig. 9 is a cross section along the line 9—9 of Fig. 2.

Fig. 10 is a diagrammatic view of a trailer train tracking around a curve and illustrating the positions of the three part draft connection and coupling for reverse directions.

Figs. 11–12 are views more or less diagrammatic of a modified construction embodying certain features of the invention.

Figs. 13–14 exhibit a modified form of intermediate coupling, and Fig. 15 is a perspective view of a portion of the mechanism for locking the steering mechanism.

Referring to the drawings where like numerals designate similar parts throughout, a trailer is illustrated whose main body frame consists of the channel side rails 1 and the cross channels 2 with gusset plates 3 and 4 respectively secured to the upper and under sides of said channel frame members 1 and 2, the side channel members 1 extending beyond the cross channels 2 at either end. Underneath the gusset plate 4, at either end of the trailer, there is a cross channel member 5, having its side flanges extending downwardly and being cut away at their middle point to straddle the reach 6. The cross channel 5 carries directly thereon a king-pin bracket 7, the latter being of inverted U form and anchored to both the cross channels 2 and 5. The king-pin 8 is anchored at its upper end to the bracket 7 and, extending downwardly through the reach 6, it passes through an upper central bearing block 9 which is anchored to and disposed within the channel of the reach 6. Cooperating with this upper bearing block 9 is a lower bearing block 10 on the swiveled truck frame 11, the latter carrying a lower bearing ring 12 corresponding to an upper bearing ring 13, the latter being carried by the main body frame through the medium of spacing blocks 14 disposed within the channel of the reach 6. For effecting the short turn of the trailer, an automatic steering mechanism is provided between the steerable wheels, in the present embodiment swiveled trucks, consisting of a segmental rack 15 disposed on each swiveled truck frame, and a shaft 16 with a pinion 17 on either end thereof meshing with these segmental racks. The shaft 16 is journaled in a bracket 18 at either end thereof, which are secured within the channel of the reach 6. This bracket 18 is formed with or carries a pressure plate 19 disposed immediately above and bearing against the swiveled truck frame in the vicinity of the segmental racks. By the mechanism just described, the rotation of either of the swiveled trucks, with reference to the main body, will result in the simultaneous and opposite rotation of the other swiveled truck. The trailer also embodies a mechanism for locking the automatic steering mechanism and the steerable wheels into any position, comprising a U-shaped locking member 20 pivoted on each of the brackets 18 at 21, these members 20 having their U-bent or free arms disposed immediately below the segmental racks and having teeth 22 thereon for engaging the teeth on the rack. These locking members 20 are actuated through the medium of bell crank levers 23, the latter being indicated as formed integrally with the arms of the members 20, and connecting links 24 which are connected to a centrally disposed rocking member 25, pivotally carried on the reach 6. The member 25 comprises the two rocking arms 26 which are secured together at their upper ends by any suitable attaching means 26′ and straddle the reach 6. An actuating cable 27 extending to convenient points on the trailer or to each of the trailers of the train is operatively connected in any suitable manner with the top of member 25 for simultaneously actuating the locking members 20 and effecting a simultaneous locking of all the automatic steering mechanism of the train. In the position shown in full lines in Figs. 2 and 15, both locking devices 20 are out of engagement with the segmental racks, but by actuating the rocking member 25 in either direction as indicated in dotted lines in Fig. 15 both members 20 are brought into locking engagement with the segmental racks to lock the steering mechanism at both ends of the truck, and also throughout the train if so connected by the cable 27.

It is also desirable to be able to effect the steering of the wheels, in this case swiveled trucks, by hand in emergencies. For this purpose each of the swiveled truck frames 11 carries on either end of the trailer a member 29 having a vertically disposed segmental rack extending downwardly therefrom, which meshes with a pinion 30 carried by the main body frame and operable by a sprocket 31. The pinion 30 and the sprocket 31 are journaled on a U-shaped member 32 suspended by and beneath the side rails 1 of the main body frame. The member 32 carries on one side thereof a bracket 33 to which is journaled a vertically disposed shaft 34, carrying on its lower end a sprocket 35 in line with and adapted to be geared to the sprocket 31 through the medium of a chain transmission. The vertical shaft 34 carries on its upper end a socket 36 which is adapted to receive in a readily removable manner the steering post 37 of a hand wheel 38. This hand steering is duplicated at either end and preferably its steering sockets are disposed at the diagonal corners of the trailer chassis. The hand wheel 38 may be readily inserted in either socket and the automatic steering mechanism thereby adjusted and operated by hand when desired.

The draft connections for the trailer comprise a draw bar 40, illustrated as of H cross section, disposed at either end of the trailer, pivotally connected with the king-pins 8, bearing upon the gusset plates 4 and retained within the king-pin brackets 7. Each draw bar 40 is capable of being locked rigidly to and in line with the reach 6 or to the steering mechanism or swiveled truck frame at will. For this purpose each draw bar 40 is provided with a sliding locking member or block 41 which is indicated in the present embodiment as of U-form, with its arms embracing and sliding along the draw bar 40. The lower ends of these arms 42 are of sufficient distance from each other to embrace the reach 6 and slide over the end thereof, whereby in its innermost position the locking member 41 effectively locks the draw bar 40 rigidly to and in line with the reach. In its outermost position this member 41 similarly embraces an inverted channel latch member 43 which is secured to the upper side of the outer edge of the swiveled truck frame 11, these members 43 being located symmetrically with respect to the steerable wheels, as for example on a line at right angles to the axle passing through the king-pin, and being secured to the frame 11 in any suitable manner, as for example by the bolts which secure the member 29 thereto. In its outermost position, therefore, the member 41 locks the bar 40 rigidly with the central portion of the swiveled truck frame 11 and at right angles to the wheel axle. There is an intermediate position indicated in dotted lines in Fig. 4, wherein the locking member 41 is not in engagement with either the reach 6 or the latch 43, and in this position of the mechanism the draw bar or draft connection 40 is free to be moved by hand or otherwise pivotally about the king-pin 8. The sliding locking members 41 at either end of the trailer are connected together in any suitable way, as for example by means of a connecting rod or cable 44 which leads to any convenient point of the trailer where it may be actuated by hand for shifting the locking mechanisms so as to lock the draw bars 40 to either the swiveled truck frames or the main body frame, or to throw them into their intermediate or neutral positions. Preferably, as illustrated, the arrangement is such that both the locking members 41 at either end of the trailer may be simultaneously disposed in the neutral or intermediate position between the reach 6 and the latch 43, but when such sliding member 41 at one end of the trailer is in engagement with the locking member 43 of the swiveled truck at that end of the trailer, the corresponding sliding member at the other end of the trailer is in engagement with the reach, and vice-versa. The cables 27 and 44 pass through a guide or slot 27' formed in or carried by the king-pin bracket 7 for supporting and maintaining them in the operative position.

The outer end of each draw bar 40 is provided with the usual upturned hook 45 to receive the eye of a cooperating coupling connection, to provide for vertical and horizontal pivotal adjustments between the two members, and a pivoted locking latch or cam 46 is provided on the upper end of the hook which is normally disposed in the path of the eye member and is automatically thrown back thereby when the eye is placed over the hook, the latch or cam 46 automatically returning to its normal position to retain the eye coupling on the hook against accidental dislodgements and uncoupling thereof. The novel draft connection and coupling devices between two trailers of a train or between a trailer and a tractor vehicle consist generally of three parts, namely the two end draw bar parts 40, which are capable of being locked to either the main body frame or the swiveled truck, and an intermediate coupling member, preferably of the same effective length as the draw bar parts 40. This intermediate coupler is designated 47 in the drawings and comprises an eye member 48 on either end thereof which is adapted to be dropped over each hook past the locking latch or cam 46, thereby pivotally connecting together the two draw bar parts 40 for universal adjustment at either end thereof. The eye members 48 are swiveled on the coupler 47 to provide for relative twisting movements between the coupled parts in the operation of the trailers. In order to effect the desired tracking operation of two short turn trailers coupled together, it is desired that the following trailer be coupled to the leading trailer by means of a draft connection fixed to the automatic steering of the following trailer which is substantially twice the length of the draft connection fixed to the main body frame of the leading trailer, and the three part construction illustrated enables two trailers to be readily connected up in the desired manner, for either direction of travel without disconnecting or reversing the intermediate coupler, as for example by providing means at either end of the intermediate coupler 47 for locking the pivotal connections with the draw bars 40 against horizontal pivotal movement, such locking means while locking against horizontal pivotal movement at the same time permitting of vertical pivotal movements. The means for effecting this, in the present embodiment, comprises a member 49 pivoted to the under part of the hook 45 and comprising a pair of vertically disposed locking jaws 50, which are adapted to straddle the under side of the eye 48 and engage a pair of opposed vertically disposed plane bearing surfaces 51 thereon, thereby locking the intermediate coupler 47 in alignment with the draw bar 40 and rigidly thereto against horizontal pivotal movement about the hook 45, the vertical pivotal movement, however, being permitted to provide for adjustments to compensate for any inequalities in the road or road level. One of the jaws 50 is extended upwardly and carries a pivoted locking cam or dog 53 which is automatically thrown out of the path of the jaws 50 in the act of locking, but which automatically returns to its locking position, as indicated in Fig. 6, when the two parts are brought into locking engagement. With the two parts thus locked, the draft and coupling connections between the two trailers consist of one draw bar part 40 connected to the reach or main body of the leading trailer, and another part locked to the automatic steering mechanism of the following trailer and consisting of the intermediate part 47 and the bar to which it is locked against horizontal pivotal movement. The actuation of the locking members 49 is effected through the medium of a pair of pivoted links 55, preferably curved upwards as indicated and pivoted at their inner ends to the sliding locking block 41, and at their outer ends to the free end of the member 49 at a point substantially beneath the locking or embracing arms 50, and the arrangement is such that when the locking block 41 is in a position to lock the bar 40 with the automatic steering mechanism or to the swiveled truck, the locking member 49 is then in position to lock the adjacent end of the member 47 against horizontal pivotal movement about the hook 45, and similarly when the locking block is in position to lock the draw bar 40 to the reach 6, the locking member 49 is in an inoperative position, permitting universal pivotal movement at that point between the intermediate member 47 and the bar 40 as indicated to the right in Fig. 4. It is observed, too, that through the tying connections 44 the locking members 49 at the opposite ends of the trailer are simultaneously shifted to provide for the reverse connections at the opposite ends, depending upon the direction of travel, rendering it impossible to have locks 49 at opposite ends of the trailer engaging their corresponding eyes 48 at the same time. The necessary connections of the bar 40 with reference to the main body and the swiveled truck and of the locking members 49 with reference to the locking of pivoted connections at opposite ends of the trailer, are automatically and simultaneously effected through the actuation of this tie-rod 44, and as above indicated, there being an intermediate position wherein the bars 40 are locked neither to the main body nor to the automatic steering mechanism, and in like manner the members 49 being in inoperative position when the sliding blocks 41 are thus in their neutral position.

In Fig. 10 we have illustrated diagrammatically two trailers connected in train and going around a curve in tracking relation to each other. The leading draw bar or draft connection 40 is connected rigidly with the main body and in line with the reach, while the trailing draw bar 40 is connected with the automatic steering mechanism, the intermediate coupling 47 being illustrated as of the same length as the draw bars 40 and having a universal pivotal connection with the leading draw bar 40, but having only a vertical pivotal movement with reference to the trailing draw bar part 40. In the event that it is desired to reverse the direction of travel, this operation is effected through the shifting of the sliding blocks 41 of each truck to the neutral position through the medium of the tie-rods 44, the locking members 49 being simultaneously released through the medium of pivoted cams 53, and with the locking devices in the neutral position, the draw bar part 40, which was previously the trailing part, may now be shifted up to the position shown in dotted lines where it can be locked to the reach, and similarly the draw bar part 40, which was previously the leading part, may be shifted up to the position shown in dotted lines where it can be locked to the automatic steering mechanism. With the locking devices in the neutral position, and the couplings 40 and 47 disposed as indicated in dotted lines in Fig. 10, the sliding blocks 41 may then be shifted all the way over from the former locking position, whereby the train of trailers is then connected for operation in the reverse direction, it being unnecessary to disconnect or reverse the coupling 47 from the draw bar parts 40.

The trailer also embodies a braking system which is particularly adapted to the control of short turn trailers of the character illustrated. This system includes an equalizing rod or beam 57 on each axle extending between the brake drums 58 and engaging the brake operating mechanism within the drums. These beams 57 are movable bodily longitudinally of the vehicle to operate the brakes and are guided in this movement by the retaining brackets or collars 59 fixed to the axles, the brackets serving to hold the beams in the operative position with respect to the brakes but permitting the forward and backward movements thereof. The beams 57 and their brakes are operated through the medium of tie-rods 60 extending throughout the trailer and preferably throughout the train of trailers for simultaneous and equal operation of the brakes of the train. The actuating rods 60 are pivotally connected with the brake beams at points approximately in the pivotal axes of the swiveled axles, namely substantially beneath the king pins, so that the steering of the vehicle does not interfere with the brake control but the brakes may be simultaneously and equally applied throughout the train regardless of the steering position of the wheels.

Figs. 11 and 12 illustrate more or less diagrammatically a modified apparatus embodying certain features of the present invention particularly adapted to trailers of lighter construction than that illustrated in the previous figures. 61 indicates generally members of the main body frame of two trailers connected in train, having axles 62 swiveled thereto through the medium of upper and lower bearing rings 63 and 64 of a fifth wheel and a king-pin clasp or bracket 65 carried by the axle, and a cooperating king-pin bracket carried by the member 61. There is a pivoted draw bar 66' at each end of the trailer which is swivelly mounted in the king-pin bracket 66 about the king-pin for pivotal movements in the horizontal plane. The two trailers are connected in train through the medium of a coupling bar 67, connected to the corresponding draw bars 66', and each draw bar 66', has pivoted on the end thereof, for vertical movement, a coupling and locking member 68 for locking the draw bar either to the main body member 61 or to the lower member 64 of the fifth wheel. In the uppermost position the member 68 is adapted to enter a slot 61' formed in the end of the body member 61 for locking the draw bar 66' rigidly to and in line with the member 61. In its lowermost position the member 68 enters a slot 73 of a sector member 72 carried with the lower bearing member 64 of the axle 62 for locking the draw bar 66' to the axle. The member 72 is provided with a guiding surface 74 for permitting the sliding of the member 68 into the slot when the bar is moved from its off center position. The coupling member 67 is of elongated and slotted character, as illustrated, and linked at either end with a curved slot 69 formed in the member 68. The arrangement is such that when one of the adjacent coupling members 68 is locked with the axle, the opposite member 68 is locked with the main body, and there is a neutral position wherein the members 68 are locked neither to the axle nor to the main body. In Fig. 11 the trailers are coupled for travel toward the left, in which case the coupling between the rear member 68 and the coupling bar 67 is locked against movement in the horizontal plane, the wide portion of the member 68 then being disposed in the elongated slot of the coupling bar. Vertical pivotal movements, however, are permitted. The leading member 68, however, has universal pivotal movement with the coupling bar 67, since its lower narrow portion is disposed in the slot of the coupling bar, which is readily turnable therein. There is also indicated diagrammatically a pivoted link connection 70 between the members 68 for causing simultaneous and reversed connections at the opposite ends of the coupling bar 67, and these links 70 may be operated through the medium of a shifting cable 71 which extends to any suitable part of the train.

Figs. 13 and 14 indicate a modification of the coupling connections for the draw bars 40 of Figs. 1–10. The draw bars 40' are similar to the draw bars 40, except that at their free ends they have a ball and socket connection 76 with a readily removable coupling bar 75, the latter being capable of ready insertion and removal therefrom by simply dropping it into the ball sockets of the bars 40', or lifting it therefrom. The mechanism for locking one of these ball and socket connections against horizontal pivotal movement comprises a sliding frame 77 carried by the coupling bar 75 and carrying a pair of pivoted locking fingers 78 at either end which are adapted to be passed over and rest by gravity upon the locking pins 80 carried by the draw bars 40'. When the frame 77 is slid over to one end or the other into abutting engagement with the bar 40', these pivoted members 78 are then swung over, as indicated, thereby locking the corresponding ball and socket connection against horizontal movement, but permitting vertical pivotal movement. The bars 40' may be provided with a pair of vertically disposed beveled or knife edges 81, for entering corresponding depressions on the ends of these sliding members 77 to assist in forming a close and tight fit against horizontal pivotal movement but permitted the vertical pivotal movement. There is a neutral position in which neither of the ball and socket connections 76 is locked against horizontal movement, and both vertical and horizontal pivotal movements are permitted at both ends of the coupling.

We claim:

1. A draft connection and coupling for short turn trailers comprising an intermediate coupler which is pivotally connected at either end for both horizontal and vertical adjustments, and means for locking either of the pivotal connections against horizontal pivotal movements at will but permitting vertical pivotal movements.

2. A three-part draft connection and coupling for short turn trailers either of whose end parts is capable of being alternately locked to and in line with a trailer body and to the automatic steering mechanism and whose intermediate part is of substantially the same length as the end parts and is capable of alternate horizontal pivotal and rigid connections with the end parts of the coupling.

3. A two-part draft connection and coupling for short turn trailers comprising a leading short arm and a trailing arm of substantially twice the length of the short arm pivotally connected with the short arm, for both horizontal and vertical movements, the short arm being rigidly connected in line with the leading trailer body and the long arm being rigidly connected with the automatic steering of the trailer truck.

4. A three-part draft connection and coupling for short turn trailers comprising a forward part connected in line with the trailer body, a trailing part rigidly connected with the automatic steering mechanism of the trailing trailer, and an intermediate part pivotally connected to the forward part for both horizontal and vertical adjustments and to the trailing part through a vertical pivotal connection only.

5. A three-part draft connection and coupling for short turn trailers having an intermediate part pivotally connected to one end part for universal adjustment and pivotally connected with the other end part for only vertical adjustment, and means at either end of said intermediate part for locking one end against horizontal pivotal movement and unlocking the other end for such movement.

6. A three-part draft connection and coupling for short turn trailers having a forward part rigidly connected to and in line with the leading trailer body, a rearward part connected to the automatic steering mechanism of the following trailer and an intermediate part pivotally connected to the leading part for both vertical and horizontal adjustments, and connected in line with the rearward part and pivoted thereto for vertical adjustments but locked against horizontal adjustments, together with means for simultaneously shifting and reversing the connections for movement in the opposite direction.

7. In a draft connection and coupling of the character set forth in claim 4 wherein the controlling and locking mechanism has a neutral position, intermediate the operative positions for movements in opposite directions.

8. A draft connection mechanism for a short turn trailer comprising a pivotal draw bar connection at either end thereof, and means for simultaneously locking the pivotal connection at one end against horizontal pivotal movement and unlocking the pivotal connection at the opposite end.

9. In a mechanism of the character set forth in claim 4 wherein the controlling mechanism and devices have a neutral position for the purpose set forth.

10. A draft connection and coupling mechanism for a short turn trailer comprising two-part draw bars at either end thereof, the draw bar parts being pivotally connected with each other for both vertical and horizontal adjustments, a locking means associated with each of said pivotal connections for locking the two parts of each draw bar in alignment with each other and against horizontal pivotal movement, and controlling devices connected with said locking means for simultaneously locking one pivotal connection and unlocking the other.

11. In a short turn trailer, a pivoted draw bar at either end thereof, means for locking either of said bars to either the automatic steering mechanism or to the trailer body frame, and means for simultaneously shifting and reversing the connections and locking means at the opposite ends of the trailer.

12. In a short turn trailer a draw bar pivoted at either end thereof, a locking mechanism associated with each draw bar for locking it either to the automatic steering mechanism or to the vehicle body, and controlling devices tying said locking means together for simultaneous shifting of the connections at opposite ends of the trailer.

13. In a short turn trailer having a main body frame and forward and leading swivel trucks connected together for automatic steering, and having king-pin connections therein, a draw bar at either end of said trailer pivoted to the king-pin, means whereby the pivoted draw bar may be locked either to and in line with the main body or to the swivel truck, and control devices tying said locking means together for simultaneously locking the bar at one end to the main body and the bar at the opposite end to the swivel truck.

14. In a trailer of the character set forth in claim 11 wherein the locking mechanisms have a neutral position for the purpose set forth.

15. In a short turn trailer, a two part draw bar coupling at one end thereof, having a pivotal connection providing for both vertical and horizontal adjustments relatively to each other and means for simultaneously locking one of said parts with the automatic steering mechanism of the trailer and locking said pivotal connection against relative horizontal movements between the two parts of the draw bar.

16. In a short turn trailer, a two part draw bar connection at one end thereof having a pivotal connection therebetween providing for both vertical and horizontal adjustments, means for locking said pivotal connection against horizontal adjustments, means associated with one of said draw bar parts for locking it either with the trailer main body or the automatic steering mechanism, and control devices for simultaneously shifting both of said locking mechanisms.

17. In a trailer of the character set forth in claim 11 wherein the locking machanisms and controlling devices have a neutral position for the purpose set forth.

18. In a short turn trailer, a two part draw bar coupling at either end thereof, each coupling having a pivotal connection between its parts providing for both vertical and horizontal adjustments relatively therebetween, a locking mechanism associated therewith for locking the pivotal connection against horizontal relative movement, a second locking mechanism associated with one part of either of said couplings for locking it either to the main body or with the automatic steering mechanism, and controlling devices and connections between all of said locking mechanisms whereby it may be simultaneously actuated for effecting the desired connections at either end of the trailer, depending upon the direction of travel.

19. In a short turn trailer having a main body framework and having a swivel truck at either end thereof connected with each other for automatic steering and to the main body by king-pins, a two part draw bar at either end of said trailer having a pivotal connection providing for both vertical and horizontal relative adjustments between the two parts of the draw bar, a locking mechanism associated with either of said pivotal connections for locking them against relative horizontal adjustments, one part of each draw bar coupling being pivotally connected with the king-pin at either end of the trailer, and a locking mechanism associated with either end of the trailer for locking the draw bar part either to the main body or the swivel truck, and control devices tying all of said locking mechanisms together for simultaneously shifting the connections at the opposite ends of the trailer, depending upon the direction of travel.

20. A short turn reversible four wheel trailer having swiveled axles adapted to be connected together for automatic steering, pivoted draw bars at either end capable of being locked to either the trailer body or the swiveled axles, automatic steering connections between the swiveled axles and hand steering connections at either end connected with the automatic steering mechanism for simultaneously actuating the swiveled trucks independently of the draw bar steering movements.

21. A reversible short turn trailer having its forward and rearward axles swiveled to the body frame and connected together for automatic steering, means locking the swiveled axles and automatic steering in any steering position, and draft connection and coupling devices at either end of said trailer, including readily shiftable connections for reversed direction of travel without disconnection of such devices.

22. A reversible short turn trailer having forward and rearward axles swiveled to the main body and connected together for automatic steering, brakes on all four wheels connected together for simultaneous and equal operation in any steering position of the wheels, and draft connection and coupling devices at either end of said trailer including readily shiftable connections for reversed direction of travel without disconnection of the devices.

23. A reversible short turn trailer having forward and rearward axles swiveled to the body and connected together for automatic steering, locking devices for locking the automatic steering mechanism and the swiveled axles in any steering position, brakes on all four wheels of the trailer, including means for operating said brakes simultaneously and equally in any and all positions of the steering mechanism, and draft connection and coupling devices at either end of said trailer, including readily shiftable connections for reversed direction of travel without disconnection of the devices.

In testimony whereof, we have signed our names to this specification.

JOHN M. EADIE.
OSCAR P. LIEBREICH.